United States Patent
Dolan et al.

(10) Patent No.: US 7,352,894 B2
(45) Date of Patent: Apr. 1, 2008

(54) SYSTEMS AND METHODS FOR ILLUMINANT ESTIMATION

(75) Inventors: John E. Dolan, Vancouver, WA (US); Jon M. Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 793 days.

(21) Appl. No.: 10/677,009

(22) Filed: Sep. 30, 2003

(65) Prior Publication Data

US 2005/0069198 A1    Mar. 31, 2005

(51) Int. Cl.
*G06K 9/00* (2006.01)
(52) U.S. Cl. ...................... 382/162; 382/167
(58) Field of Classification Search ............ None
See application file for complete search history.

(56) References Cited

U.S. PATENT DOCUMENTS

| | | | |
|---|---|---|---|
| 4,648,051 A | | 3/1987 | Wandell |
| 4,663,663 A | * | 5/1987 | Lee .................. 358/506 |
| 4,992,963 A | | 2/1991 | Funt |
| 5,793,884 A | * | 8/1998 | Farrell ................ 382/167 |
| 5,805,213 A | * | 9/1998 | Spaulding et al. ....... 348/222.1 |
| 6,038,339 A | | 3/2000 | Hubel |
| 6,243,133 B1 | | 6/2001 | Spaulding |
| 6,249,601 B1 | | 6/2001 | Kim |
| 6,480,299 B1 | * | 11/2002 | Drakopoulos et al. ...... 358/1.9 |
| 6,573,932 B1 | * | 6/2003 | Adams et al. .......... 348/224.1 |
| 6,639,628 B1 | * | 10/2003 | Lee et al. ............. 348/223.1 |
| 6,724,422 B1 | * | 4/2004 | Werner ................. 348/187 |
| 7,002,624 B1 | * | 2/2006 | Uchino et al. .......... 348/225.1 |
| 7,015,955 B2 | * | 3/2006 | Funston et al. ......... 348/223.1 |

OTHER PUBLICATIONS

Buchsbaum, G. "A Spatial Processor Model for Object Color Perception," J. Franklin Inst., vol. 310, 1980.
Maloney, L.T.; Wandell, B.W. "Color Constancy: a method for recovering surface spectral reflectance", J. Optical Soc. Am. A, vol. 3, pp. 29-33, 1986.
Brainard, D.H.; W. T. "Bayesian color constancy," J. Optical Soc. Am. A, vol. 14, pp. 1393-1411, 1997.
Finlayson, G.D.; Hordley, S.D.; Hubel, P.M. "Color by correlation: a simple, unifying framework for color constancy," IEEE Trans. Pattern Analysis and Machine Intelligence, vol. 23, pp. 1209-1221, 2001.
Finlayson, G.D. Hordley, S.D.; Hubel, P.M. "Unifying color constancy," J. Imaging Science and Technology, vol. 45, pp. 107-116, 2001.
Luo, Jiebo; Etz, Stephen "A Physical Model-Based Approach to Detecting Sky in Photographic Images," IEEE Transaction on Image Processing, vol. 11, No. 3, pp. 201-212, Mar. 2002.
Maloney, L. T., "Physics-Based Approaches to Modeling Surface Color Perception".
Finlayson, G.D., Color In Perspective, IEEE PAMI, 1996, pp. 1034-1038.

(Continued)

*Primary Examiner*—Wenpeng Chen
*Assistant Examiner*—Yuzhen Ge
(74) *Attorney, Agent, or Firm*—Krieger Intellectual Property, Inc.; Scott C. Krieger

(57) ABSTRACT

Embodiments of the present invention comprise systems and methods for estimation of an image illuminant.

1 Claim, 3 Drawing Sheets

Match surfaces for 81 sample illuminants under different metrics.

OTHER PUBLICATIONS

Forsyth, D.A., A Novel Approach to Color Constancy, ICCV88, pp. 9-18.

Swain, M.J. and Ballard, D.H., Color Indexing, IJCV(7), No. 1, Nov. 1991, pp. 11-32.

Rubner, Y., Tomasi, C. and Guibas, L., The Earth Movers Distance as a Metric for Image Retrieval, Technical Report STAN-CS-TN-98-86, Stanford Computer Science Department, Sep. 1998.

* cited by examiner

Example grid of 81 illuminants in x-y chromaticity coordinates

Match surfaces for 81 sample illuminants under different metrics.

SYSTEMS AND METHODS FOR ILLUMINANT ESTIMATION

TECHNICAL FIELD

The present invention relates generally to digital image processing and more particularly to methods and systems for estimation of an image illuminant.

BACKGROUND

Colors viewed in an image are dependent on the light that illuminates the subject of the image. Different illuminants will cause different light to be reflected from surfaces of the image subject matter. The human visual system approximately corrects these variations in reflected light such that surfaces remain approximately color constant. However, when images are captured on media and viewed under a light source different than the source in the imaged scene, these natural corrections do not take place. Accordingly, it is often desirable for recorded images to be color-balanced to a standard, reference light source in order to appear as they would to the natural eye. This balancing or color correction can be performed once the scene illuminant is identified.

Estimating the color parameters of an image illuminant is an important first step in color correcting a digital image. In a strict model-matching scheme, the accuracy of the estimation is often limited by the size of the model base. This is because illuminant parameter values are explicitly available only at the predefined model positions and because the match procedure itself typically reduces to selection of the "best-fit" model from within a limited set. Increasing the number of models can improve accuracy. However, additional memory is required to store the larger set of models and additional time is required to match against all models in the larger model base.

Under known methods, illuminant estimation employs a fixed set of known illuminants, which are each characterized by the gamut of color values that are possible under that illuminant. A color histogram is computed for the image and is compared with each of the model histograms using some form of match metric such as intersection, correlation, minimum distance, etc. The match metric is used to select the model that best accounts for the image data from the set of illuminants.

SUMMARY

Embodiments of the present invention increase illuminant or colorbalance correction estimation accuracy by fitting an analytic form to the match surface derived from initial comparisons of the image data against the model base. The analytic form may then be used to interpolate between model data.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Illuminant estimation may be approached through a model matching strategy. In such a regime, a fixed set of illuminants is modeled. Modeling may be performed parametrically, by sample statistics or by other methods. The model that best accounts for the image data is chosen as the scene illuminant most likely to have produced the image. This decision process relies on computing a similar parametric or statistical description from the image and then performing a matching procedure of the image description with respect to the model base in order to select the "best" model.

Figure 1:
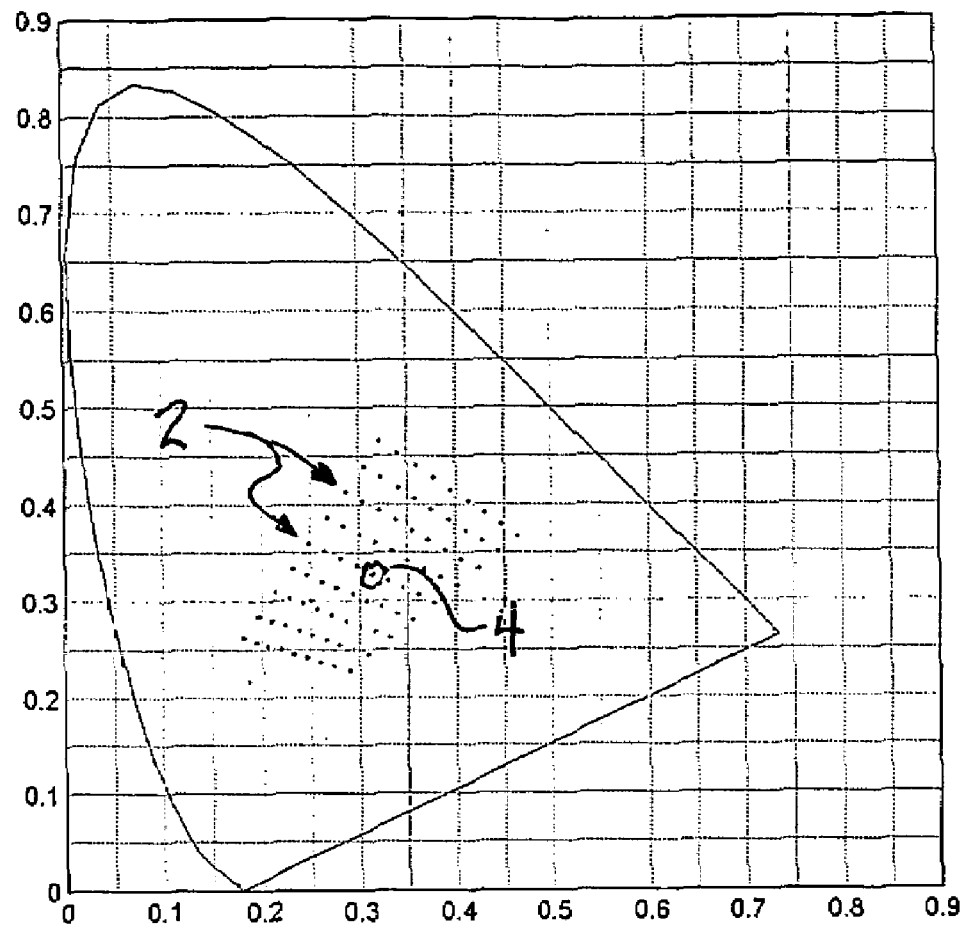
FIG. 1 is a diagram illustrating a set of candidate illuminants as x-y chromaticity coordinates.

An exemplary model set, shown in FIG. 1, consists of 81 illuminants plotted in x-y chromaticity space. Chromaticity coordinates are shown as dots 2. In this particular example, these coordinates have been regularly sampled in CIE-Lab coordinates centered on the D65 white point 4, which is a daylight reference illuminant. The coordinates are then mapped to x-y chromaticity space as displayed in FIG. 1.

In some embodiments of the present invention, a match surface is calculated to estimate a likelihood of each illuminant being the illuminant of a particular image. In some embodiments, each image element, such as a pixel, is compared to the series of model illuminants to determine a match score, which is an indicator of the likelihood of being the illuminant of that element of the image.

Figure 2:
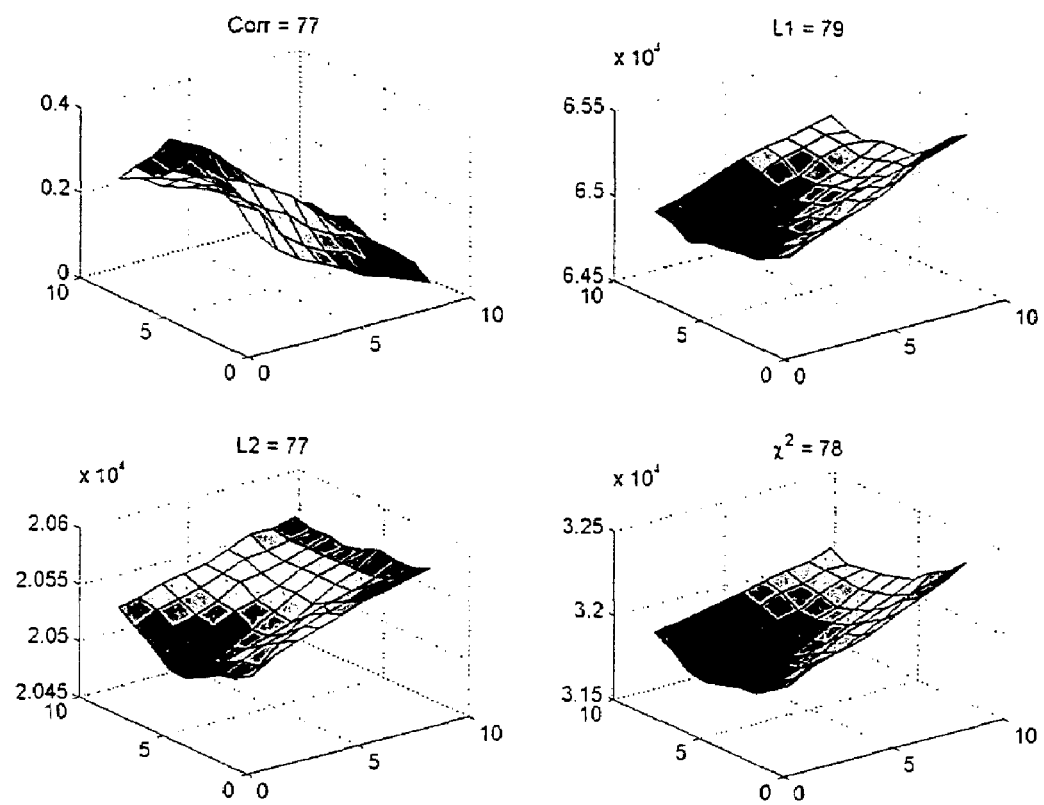
FIG. 2 is a diagram of an exemplary match score surface.
Figure 3:
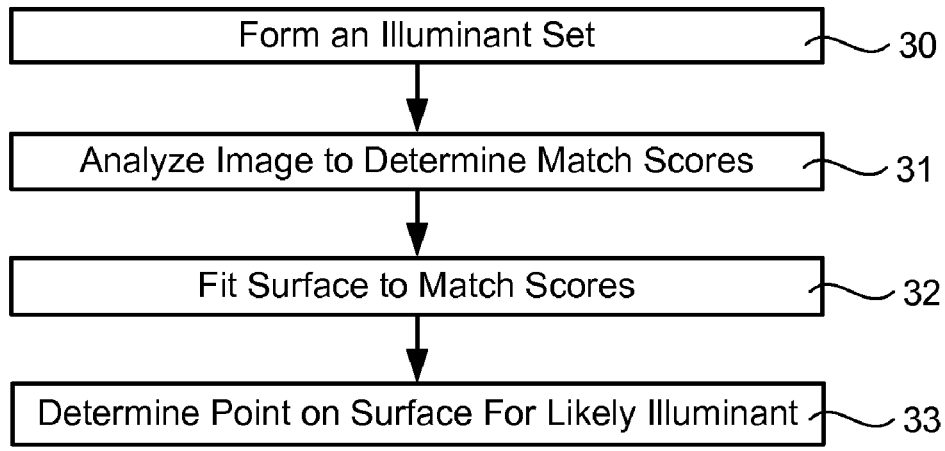
FIG. 3 is a flow chart showing a method of embodiments of the present invention comprising forming an illuminant set.
Figure 4:
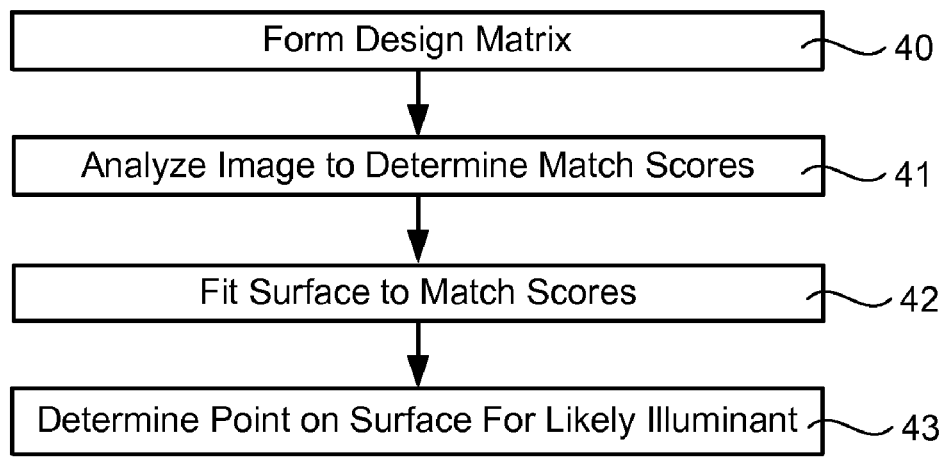
FIG. 4 is a flow chart showing a method of embodiments of the present invention comprising forming a design matrix.
Figure 5:
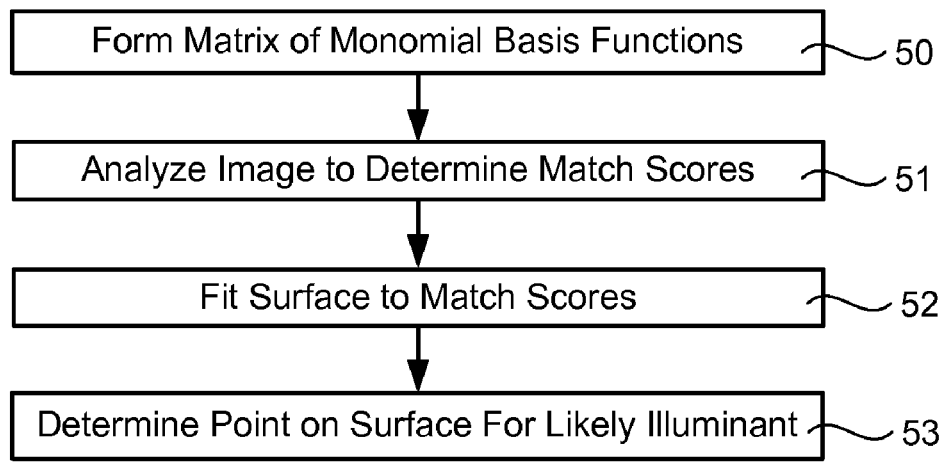
FIG. 5 is a flow chart showing a method of embodiments of the present invention comprising forming a matrix of monomial basis functions.

An exemplary match surface is shown in FIG. 2, which is a plot of x and y chromaticity and the match score. In this plot, the chromaticity of each candidate or model illuminant is plotted on the horizontal axes while the vertical axis represents the likelihood of being the image illuminant or match score. In some embodiments, illustrated in FIGS. 3, 4 and 5, a fixed set of illuminants 30, which may or may not occupy a conventional grid, identifies the horizontal position of a point of the match surface. An analysis 31,41,51 of each illuminant in the fixed set with respect to image data then identifies the z-axis coordinate of the surface point. Once the surface points are identified, an analytic form may be matched 32, 42 and 52 to the surface. In some embodiments, we may assume an over-determined system. In some embodiments and for some image types, a quadratic form works well, however, other orders of surfaces, such as cubic and quartic may be used.

In some embodiments of the present invention a biquadratic surface may be used, which can be specified by the following implicit form:

$$f(x,y)=Ax^2+Bxy+Cy^2+Dx+Ey+F.$$

The value of this form at the x-y coordinates of each model illuminant is given by:

$$AV=Z,$$

where A is the so-called design matrix and V is a vector of surface parameters. In some embodiments, V is chosen so as to minimize the error between this analytic form and the corresponding match surface values.

One well-known technique for minimizing the sum of squared errors for such a system is the pseudoinverse method. Note that because the chromaticity coordinates of the model set are all determined a priori, the pseudoinverse matrix can be computed entirely offline. Some embodiments of the present invention use this method, which comprises the following steps.

Generally steps 1 and 2 will be performed offline, however, they may be performed online as well when resources and time constraints allow.

1) Form the design matrix 40 for the predetermined set of model illuminants, based on each model's chromaticity coordinates. This can be a matrix of monomial basis functions 50 in the chromaticity coordinates of each illuminant. For a quadratic form it is defined as follows:

$$A = \begin{bmatrix} x_1^2 & x_1 y_1 & y_1^2 & x_1 & y_1 & 1 \\ x_2^2 & x_2 y_2 & y_2^2 & x_2 & y_2 & 1 \\ & & \vdots & & & \\ x_n^2 & x_n y_n & y_n^2 & x_n & y_n & 1 \end{bmatrix}$$

2) Compute the Moore-Penrose pseudoinverse of the design matrix. For a quadratic form this is a 6 ×N matrix where N is the number of illuminant models. It is defined as:

$$\Sigma = (A^T A)^{-1} A^T$$

The following steps are generally performed online.

3) Form the image histogram and compute the corresponding match surface over the model set (e.g. as shown in FIG. 2). The vector of match scores corresponding to the N illuminants may be designated as follows:

$$Z = \begin{bmatrix} \chi_1^2 \\ \chi_2^2 \\ \vdots \\ \chi_n^2 \end{bmatrix}$$

4) Find the minimum value $\chi_m^2$ of Z and the chromaticity coordinates $x_{min} = [x_m \ y_m]^T$ o the associated illuminant.

5) Compute the parameter vector $V = [A\ B\ C\ D\ E\ F]^T$ for the best-fit least-squares approximating surface as follows:

$$V = \Sigma Z$$

The best fit surface is then given as:

$$f(x,y) = V^T X, \text{ with } X = [x^2\ xy\ y^2\ x\ y\ 1]^T$$

Other surface fit methods may be used in other embodiments.

6) Form the partial derivatives of the resulting surface with respect to x and y and set these equal to zero, since these derivatives vanish at the extremum.

$$\frac{\partial f}{\partial x} = 2Ax + By + D = 0$$

-continued $$\frac{\partial f}{\partial y} = Bx + 2Cy + E = 0$$

In matrix notation this can be written simply as:

$$Jx = K \text{ or } \begin{bmatrix} 2A & B \\ B & 2C \end{bmatrix} \begin{bmatrix} x \\ y \end{bmatrix} = \begin{bmatrix} -D \\ -E \end{bmatrix}$$

7) Solve for the chromaticity coordinates $x = [x\ y]^T$ of the minimum point of the analytic form.

$$\begin{bmatrix} x \\ y \end{bmatrix} = \frac{1}{4AC - B^2} \begin{bmatrix} 2C & -B \\ -B & 2A \end{bmatrix} \begin{bmatrix} -D \\ -E \end{bmatrix}$$

In alternative embodiments, maximum points may be used to determine the best match.

8) If the resulting point is closer to the reference illuminant than minimum model point $x_{min}$, set the scene illuminant to coordinates of the analytic minimum, $x_0 = x$; otherwise set it to the coordinates of the minimum-distance model, $x_0 = x_{min}$. This selection criterion always chooses the more conservative correction, which may be a good strategy in practice. However, In some embodiments, once the chromaticity coordinates of the scene illuminant are estimated, the corresponding correction matrix can be computed in any of a number of ways. For example, if a linear model of surface reflectances and illuminants is used, one might first transform the scene illuminant xyY coordinates $(x_0\ y_0\ 1)^T$ to the corresponding tri-stimulus XYZ value $\bar{x}_0 = (X_0\ Y_0\ Z_0)^T$ and then use the following equations to derive the corresponding correction matrix C for the scene illuminant.

$$w_{E0} = (TB_E)^{-1} \bar{x}_0$$

$$E_0 = \text{diag}(B_E w_{E0})$$

$$E_{ref} = \text{diag}(spd_{ref})$$

$$C = TE_{ref} B_S (TE_0 B_S)^{-1}$$

where

T represents a matrix of color matching functions or sensor sensitivities $B_E$ represents an illuminant spectral power linear model diag represents an operator that converts a vector to a diagonal matrix $spd_{ref}$ represents a reference illuminant spectral power distribution $B_S$ represents a surface reflectance linear model In other embodiments, other selection criteria can be used. In some embodiments, the analytic minimum may be selected if it occurs within the hull of the model set. If the analytic minimum does not fall within the hull of the model set, the minimum model value may be selected. In still other embodiments, exterior analytic minima can be projected along the line to the daylight reference and the intersection of this line with the hull of the model set can be the selected point.

In other embodiments color coordinates may be represented in a three dimensional colorspace, with corresponding three-dimensional image and model color distributions and corresponding higher dimensional design matrices.

In some embodiments, the analytic form can be resolved to an arbitrary accuracy by first employing differential geometry to locate the extremum of the form and then using interpolation to derive the corresponding illuminant parameters or colorbalance correction parameters for this location.

Embodiments of the present invention also offer the possibility of decreasing the size of the model base and consequently decreasing the time and/or resources required for the match step. This is because the accuracy of the illuminant parameter estimation is not directly constrained by the number of models. Only enough models to ensure the stability of the analytic fit are required.

Algorithms of embodiments of the present invention may be implemented in software on a general-purpose computer or on a special-purpose computing device such as a DSP. Embodiments may also be implements by dedicated circuitry such as an ASIC. Embodiment processes may be implemented in any image processing pipeline that outputs an image for display, for retrieval, for indexing or for other purposes.

What is claimed is:

1. A method for estimating an image illuminant, the method comprising:

forming a matrix of monomial basis functions in the color coordinates of each of a plurality of candidate illuminants;

analyzing an image in relation to said plurality of candidate illuminants to determine a plurality of match scores for said plurality of candidate illuminants;

fitting a surface to said plurality of match scores, said surface representing illuminant values other than said candidate illuminants; and determining a point on said surface, said point corresponding to the data representing a likely illuminant for said image.

* * * * *